2,953,587

STABILIZED CYCLOPENTADIENYL MANGANESE TRICARBONYLS

Ernest Clinton, Huntington Woods, Mich., and John G. Willard, San Antonio, Tex., assignors to Ethyl Corporation, New York, N.Y., a corporation of Delaware No Drawing. Filed Dec. 18, 1958, Ser. No. 781,212

3 Claims. (Cl. 260—429)

This invention relates to and has as its chief object stabilizing cyclopentadienyl manganese tricarbonyl antiknock compounds against sunlight-induced oxidative deterioration.

Recently a new class of compounds extremely useful as antiknock agents has been discovered and developed. This class of compounds, which comprises the cyclopentadienyl manganese tricarbonyls, particularly those in which the cyclopentadienyl group is a hydrocarbon radical containing 5 to 17 carbon atoms, is described in U.S. 2,818,416 and 2,818,417, issued December 31, 1957. Besides spectacular antiknock effectiveness, these compounds have many additional properties which render them of commercial interest as antiknock agents. Among these properties are unexpectedly great stability characteristics. These directly result from the rare gas configuration possessed by the manganese compounds. By virtue of the five electrons donated to the manganese by the cyclopentadienyl radical and of two electrons donated by each carbonyl group, the manganese atom in the compound possesses the structure of the next higher rare gas, krypton. Hence, the generally high stability of these antiknock compounds is one of their important features.

Despite their great general stability, cyclopentadienyl manganese tricarbonyls are susceptible to oxidative deterioration when exposed to air and direct sunlight. The adverse role of sunlight is important. When these compounds are exposed to diffuse daylight and air, deterioration is so much more insignificant that no real problem exists. Even when these manganese compounds are contacted with air and exposed to direct sunlight, deterioration is not particularly rapid. However, once it sets in, it can be extensive. Moreover it will continue even if the sunlight-exposed sample is placed in the dark.

We have now found that small amounts of hydrocarbyl esters of thioglycolic acid are uniquely effective in inhibiting this sunlight-induced oxidative deterioration. Therefore, this invention is a cyclopentadienyl manganese tricarbonyl antiknock compound stabilized against sunlight-induced oxidative deterioration by the presence therein of from about 0.02 to about 0.5 mole of a hydrocarbyl ester of thioglycolic acid per mole of said compound. Most of these manganese compounds are liquids at ordinary temperatures and readily dissolve the thioglycolates in the above proportions. Formed are light-yellow, transparent solutions. Those manganese compounds which are solids at room temperature can be stabilized in the manner of this invention by heating them to their melting points, dissolving the thioglycolates in them and then allowing the system to cool to room temperature.

Alkyl thioglycolates are especially effective and readily available as commercial items. Hence they are preferred.

The powerful stabilizing effects of the compositions of this invention persist whether or not the manganese compound is dissolved in a hydrocarbon medium, such as gasoline.

We do not understand why or how the thioglycolates accomplish the results of this invention. For one thing, thioglycolates are generally considered in the art as being devoid of antioxidant properties. Hence, there is no underlying basis to even begin to explain why or how thioglycolates so elegantly combat sunlight-induced oxidative deterioration of cyclopentadienyl manganese tricarbonyls.

The uniqueness of this invention is made even clearer by noting that a widely-used commercial stabilizer of known ability to inhibit ultraviolet light-induced oxidative deterioration was found to actually increase the deterioration of cyclopentadienyl manganese tricarbonyls under the above drastic conditions.

To prepare our compositions, apt amounts of the ingredients are mixed together in a tank or other suitable vessel. The order of addition is not important. When the manganese compound is a solid at room temperature, the contents of the mixing tank should be heated to melt the manganese compound during the blending. An alternative is to pre-melt the manganese compound, introduce it into the blending tank as a liquid and do the blending before the compound solidifies.

The following examples illustrate this invention.

Example I

To 100 moles of methylcyclopentadienyl manganese tricarbonyl is added two moles of methyl thioglycolate. After mixing, the resultant liquid is stable in the presence of air when exposed to sunlight.

Example II

With 100 moles of a liquid mixture of 75 weight percent of methylcyclopentadienyl manganese tricarbonyl and 25 weight percent of cyclopentadienyl manganese tricarbonyl is blended 50 moles of dodecyl thioglycolate. This mixture has very good resistance to oxidative deterioration even when placed in sunlight.

Example III

Mixed together are 100 moles of octylcyclopentadienyl manganese tricarbonyl and 10 moles of cyclohexyl thioglycolate. This forms a mixture which is very resistant to sunlight-induced oxidative deterioration.

Example IV 20 moles of tolyl thioglycolate (mixed tolyl isomers) is fed into 100 moles of diethylcyclopentadienyl manganese tricarbonyl. The system is stirred. The resultant product has great resistance against sunlight-induced oxidative deterioration.

Example V

Into a tank equipped with heating means is placed 100 moles of cyclopentadienyl manganese tricarbonyl. This compound is melted by raising its temperature to 77° C. While this compound is in the liquid state, five moles of allyl thioglycolate is added to it and the system stirred. On cooling, the resultant mixture has very good resistance to oxidative deterioration in direct sunlight.

Example VI

Homogeneously mixed at 50–51° C. are 100 moles of indenyl manganese tricarbonyl and 40 moles of benzyl thioglycolate. The product can be exposed to air and sunlight without much deterioration occurring.

Example VII

To 10 moles of trimethylcyclopentadienyl manganese tricarbonyl dissolved in a paraffinic gasoline to a concentration of 2 grams of manganese per gallon is added 3 moles of cumenyl thioglycolate. The solution is stirred.

It possesses very good resistance against sunlight-induced oxidative deterioration.

Example VIII

With 10 moles of dihexylcyclopentadienyl manganese tricarbonyl dissolved in a motor gasoline base stock to a concentration of 0.5 gram of manganese per gallon is blended one mole of diisopropylcyclohexyl thioglycolate. The fuel is more resistant to sunlight-caused oxidative deterioration of the carbonyl than in the absence of the stabilizer.

Example IX

α-Naphthyl thioglycolate is mixed with methylisopropylcyclopentadienyl manganese tricarbonyl at a mole ratio of 0.4:1 respectively. The carbonyl is thereby made highly resistant to oxidative deterioration promoted by sunlight.

Example X

Mixed together in a mole ratio of 0.025:1 are butyl thioglycolate and phenylcyclopentadienyl manganese tricarbonyl. The carbonyl is less air-sensitive in direct sunlight than it usually is.

To demonstrate the unique benefits of this invention, sunlight exposure tests were conducted. In one run, methylcyclopentadienyl manganese tricarbonyl containing isooctyl thioglycolate at a concentration of 0.5 mole per mole of the carbonyl was exposed to direct sunlight for 25 minutes in a clear glass bottle with excess air outage. At the end of this time, the sludge which formed was removed, washed and weighed. It amounted to only 4.0 milligrams per 25 milliliters of the carbonyl.

In a control experiment, additive-free methylcyclopentadienyl manganese tricarbonyl was subjected to the same test conditions and found to contain 34.5 mg. of sludge per 25 ml. of carbonyl. In still another experiment, methylcyclopentadienyl manganese tricarbonyl was treated with a commercial UV stabilizer (0.25 mole of stabilizer per mole of manganese compound). On completion of the same test procedure, it was found that 102 mg. of sludge per 25 ml. of carbonyl had been formed. Note that this amount far exceeded the amount of sludge which was formed even in the control experiment.

The above sunlight-exposed control sample and sample of the product of this invention were then allowed to stand for over 15 hours in the dark and the amounts of sludge which formed in this period removed, washed and weighed. The control sample yielded an additional 51 mg. of sludge per 25 ml. of carbonyl. In sharp contrast, the mixture of this invention formed, per 25 ml. of carbonyl, only 4.3 mg. more of sludge.

These results clearly show the outstanding stability possessed by the compositions of this invention. Our hydrocarbyl thioglycolates not only squelch the oxidative breakdown of the carbonyls during sunlight exposure, but greatly suppress the bad effects which normally occur after such exposure.

Complete details concerning the preparation of the cyclopentadienyl manganese tricarbonyls, the use thereof as fuel antiknock additives, and other gasoline additives that can be associated therewith are given in U.S. 2,818,416 and 2,818,417.

The hydrocarbyl esters of thioglycolic acid used pursuant to this invention can be represented by the general formula.

$$HSCH_2COOR$$

where R is a hydrocarbon group, such as an alkyl, cycloalkyl, alkenyl, aryl, aralkyl, alkaryl or related type of radical. Preferably this ester group —R— contains from one to about 12 carbon atoms. While the presence of more carbon atoms does not significantly change the effectiveness of the compound for the present purpose, it does result usually in a more expensive compound. Methods of preparing these thioglycolate esters are well known and have been published in the literature. For example, see Bull. Chem. Soc. Japan, 29 85–8 (1956).

We claim:

1. A cyclopentadienyl manganese tricarbonyl antiknock compound whose cyclopentadienyl group is a cyclopentadienyl hydrocarbon radical containing 5 to 17 carbon atoms, said compound being stabilized against sunlight-induced oxidative deterioration by the presence therein of from about 0.02 to about 0.5 mole of a hydrocarbyl ester of thioglycolic acid per mole of said compound.

2. The composition of claim 1 wherein said ester is an alkyl thioglycolate.

3. The composition of claim 1 wherein said ester is an alkyl thioglycolate and said compound is methylcyclopentadienyl manganese tricarbonyl.

No references cited.